(12) United States Patent
Kanamori et al.

(10) Patent No.: US 11,329,490 B2
(45) Date of Patent: May 10, 2022

(54) MANAGEMENT DEVICE, MANAGEMENT METHOD, AND STORAGE MEDIUM

(71) Applicant: HONDA MOTOR CO., LTD., Tokyo (JP)

(72) Inventors: Iori Kanamori, Wako (JP); Kentaro Nagoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 16/744,330

(22) Filed: Jan. 16, 2020

(65) Prior Publication Data

US 2020/0244081 A1 Jul. 30, 2020

(30) Foreign Application Priority Data

Jan. 25, 2019 (JP) .............................. JP2019-011233

(51) Int. Cl.
*H02J 7/00* (2006.01)
*H02J 7/14* (2006.01)

(52) U.S. Cl.
CPC ........ *H02J 7/00036* (2020.01); *H02J 7/1446* (2013.01)

(58) Field of Classification Search
None
See application file for complete search history.

(56) References Cited

U.S. PATENT DOCUMENTS

| 8,493,026 | B2 * | 7/2013 | Sahinoglu | G06Q 30/06 |
| | | | | 320/109 |
| 2008/0039980 | A1 * | 2/2008 | Pollack | B60L 53/57 |
| | | | | 700/295 |
| 2009/0174365 | A1 * | 7/2009 | Lowenthal | B60L 53/67 |
| | | | | 320/109 |
| 2009/0177595 | A1 * | 7/2009 | Dunlap | B60L 55/00 |
| | | | | 705/412 |
| 2009/0313098 | A1 * | 12/2009 | Hafner | G07F 15/008 |
| | | | | 705/14.1 |
| 2009/0315512 | A1 * | 12/2009 | Ichikawa | B60L 50/16 |
| | | | | 320/109 |
| 2011/0302078 | A1 * | 12/2011 | Failing | H02J 5/00 |
| | | | | 705/39 |

FOREIGN PATENT DOCUMENTS

| JP | 2016-018504 | 2/2016 |
| JP | 2017-134894 | 8/2017 |
| JP | 2018-190249 | 11/2018 |
| JP | 2018-205873 | 12/2018 |
| WO | 2017/009978 | 1/2017 |

OTHER PUBLICATIONS

Japanese Office Action for Japanese Patent Application No. 2019-011233 dated Feb. 22, 2022.

* cited by examiner

*Primary Examiner* — Arun C Williams
(74) *Attorney, Agent, or Firm* — Amin, Turocy & Watson, LLP

(57) ABSTRACT

A management device includes a manager configured to manage power stored in a secondary battery provided to a user for stationary use and execute a power exchange business, the power exchange business being performed by connecting the secondary battery to a power network, and a deriver configured to derive return information for returning part of a profit obtained through the power exchange business to the user.

9 Claims, 7 Drawing Sheets

| BATTERY ID | LEVEL OF DETERIORATION AT TIME OF PROVISION | DATE OF PROVISION | ESTIMATED CHARGING CAPACITY | USER ONLY POWER | OPERATOR-PRIORITIZED POWER | SOLD POWER | USER RETURN RATIO |
|---|---|---|---|---|---|---|---|
| 0001 | LV1 | 2017.2 | ○○KWh | ○○% | ○○% | ○○KWh | 20% |
| 0002 | LV5 | 2015.9 | ○○KWh | ○○% | ○○% | ○○KWh | 20% |
| 0003 | LV2 | 2016.1 | ○○KWh | ○○% | ○○% | ○○KWh | 20% |

FIG. 9

| BATTERY ID | LEVEL OF DETERIORATION AT TIME OF PROVISION | INSTALLATION PERIOD | ESTIMATED CHARGING CAPACITY | ESTIMATED SOC (USER ONLY) | ESTIMATED SOC (OPERATOR PRIORITIZED) | SOLD POWER | USER RETURN RATIO |
|---|---|---|---|---|---|---|---|
| 0001 | LV2 | 1 YEAR AND 2 MONTHS | ○○KWh | ○○% | ○○% | ○○KWh | 19.5% |
| 0002 | LV5 | 4 YEARS AND 7 MONTHS | ○○KWh | ○○% | ○○% | ○○KWh | 22.0% |
| 0003 | LV1 | 12 YEARS AND 4 MONTHS | ○○KWh | ○○% | ○○% | ○○KWh | 20.0% |
|  |  |  |  |  |  |  |  |

| LEVEL OF DETERIORATION AT TIME OF PROVISION | USER RETURN RATIO |
|---|---|
| LOW | LOW |
| MODERATE | MODERATE |
| HIGH | HIGH |

FIG. 11

| INSTALLATION PERIOD | USER RETURN RATIO |
|---|---|
| SHORT | LOW |
| MODERATE | MODERATE |
| LONG | HIGH |

MANAGEMENT DEVICE, MANAGEMENT METHOD, AND STORAGE MEDIUM

CROSS-REFERENCE TO RELATED APPLICATION

This application claims priority to and the benefit from Japanese Patent Application No. 2019-011233, filed on Jan. 25, 2019, the contents of which are hereby incorporated by reference into the present application.

BACKGROUND OF THE INVENTION

Field of the Invention

The present invention relates to a management device, a management method, and a storage medium.

Description of Related Art

An in-vehicle secondary battery mounted in an electric vehicle deteriorates with use and a charging capacity decreases. When the in-vehicle secondary battery deteriorates, the charging capacity becomes low, and a charging capacity required for the in-vehicle secondary battery is not satisfied, the in-vehicle secondary battery becomes inappropriate for mounting and use in an electric vehicle. Such a secondary battery that has deteriorated may be used for uses other than for electric vehicles in some cases.

In order to reuse a secondary battery that has deteriorated, there is a technology for selecting a battery pack that is included in an in-vehicle secondary battery as a target for a determination as to whether or not reuse is allowed or a recycling target according to a level of deterioration of the secondary battery estimated on the basis of a usage history of the secondary battery (for example, Japanese Unexamined Patent Application, First Publication No. 2017-134894, hereinafter, referred to as "Patent Document 1"). Here, the battery pack not selected as the recycling target is used as the target for a determination as to whether or not reuse is allowed.

In the technology disclosed in Patent Document 1, it is necessary to disassemble the battery pack in order to reuse the in-vehicle secondary battery that has deteriorated. Therefore, it takes time and effort to reuse the in-vehicle secondary battery. For example, it is conceivable that the in-vehicle secondary battery is transferred to a user, as is, free of charge and used as, for example, a stationary battery in a charger, and is used for a power exchange business hat is performed by connecting the battery to a power network. However, it is difficult to adjust profit between an operator executing the power exchange business and the user.

The present invention has been made in view of such circumstances, and an object of the present invention is to provide a management device, a management method, and a storage medium capable of easily adjusting a profit between an operator executing a power exchange business and a user.

SUMMARY OF THE INVENTION

A management device, a management method, and a storage medium according to the present invention adopt the following configurations.

(1) An first aspect of the present invention is a management device including: a manager configured to manage power stored in a secondary battery provided to a user for stationary use and execute a power exchange business, the power exchange business being performed by connecting the secondary battery to a power network; and a deriver configured to derive return information for returning part of a profit obtained through the power exchange business to the user.

(2) In the aspect (1), the deriver is configured to derive the return information on the basis of an amount of power of the secondary battery used by an operator of the power exchange business.

(3) In the aspect (1) or (2), the manager is configured to manage the power stored in the secondary battery as power used by an operator of the power exchange business and power used exclusively by the user.

(4) In the aspect (3), the manager is configured to manage the power stored in the secondary battery with a maximum allowable value of power used exclusively by the user being constant.

(5) In the aspect (1), the deriver is configured to adjust the return information on the basis of a level of deterioration of the secondary battery.

(6) In the aspect (5), the deriver is configured to set a ratio of return to the user to be lower as a level of deterioration of the secondary battery at the time of provision decreases.

(7) In the aspect (5) or (6), the deriver is configured to set the ratio of return to the user to be higher as an installation period of the secondary battery becomes longer.

(8) In any one of the aspects (1) to (7), the secondary battery has been used for in-vehicle use.

(9) A second aspect of the present invention is a management method using a computer, including: managing, power stored in a secondary battery provided to a user for stationary use and executing a power exchange business, the power exchange business being performed by connecting the secondary battery to a power network; and deriving, return information for returning part of a profit obtained through the power exchange business to the user.

(10) A third aspect of the present invention is a computer-readable non-transitory storage medium storing a program, the program causing a computer to: manage power stored in a secondary battery provided to a user for stationary use and execute a power exchange business, the power exchange business being performed by connecting the secondary battery to a power network; and derive return information for returning part of a profit obtained through the power exchange business to the user.

According to (1) to (10), it is possible to easily adjust the profit between the operator executing the power exchange business and the user.

According to (2), and (5) to (7), it is possible to return the profit appropriate for the power exchange business to the user.

According to (3), it is possible to secure power to be used by the user.

According to (4), it is possible to secure sufficient power for use by the user.

According to (8), it is possible to easily reuse an in-vehicle secondary battery that has deteriorated.

BRIEF DESCRIPTION OF THE DRAWINGS

FIG. 9 is a diagram showing an example of battery data of a second embodiment.

FIG. 10 is a diagram showing an example of a user return ratio according to a level of deterioration when the battery is provided.

FIG. 11 is a diagram showing an example of a change in a user return ratio according to a battery installation period.

DETAILED DESCRIPTION OF THE INVENTION

Hereinafter, embodiments of a management device, a management method, and a storage medium according to the present invention will be described with reference to the drawings. In the following description, a vehicle 10 is assumed to be an electric vehicle having a secondary battery mounted therein. However, the vehicle 10 may be a vehicle that can be charged from the outside and includes a secondary battery that supplies power for traveling, or may be a hybrid vehicle or a fuel cell vehicle.

First Embodiment

Hereinafter, a first embodiment will be described.
[Overall Configuration]

Figure 1:
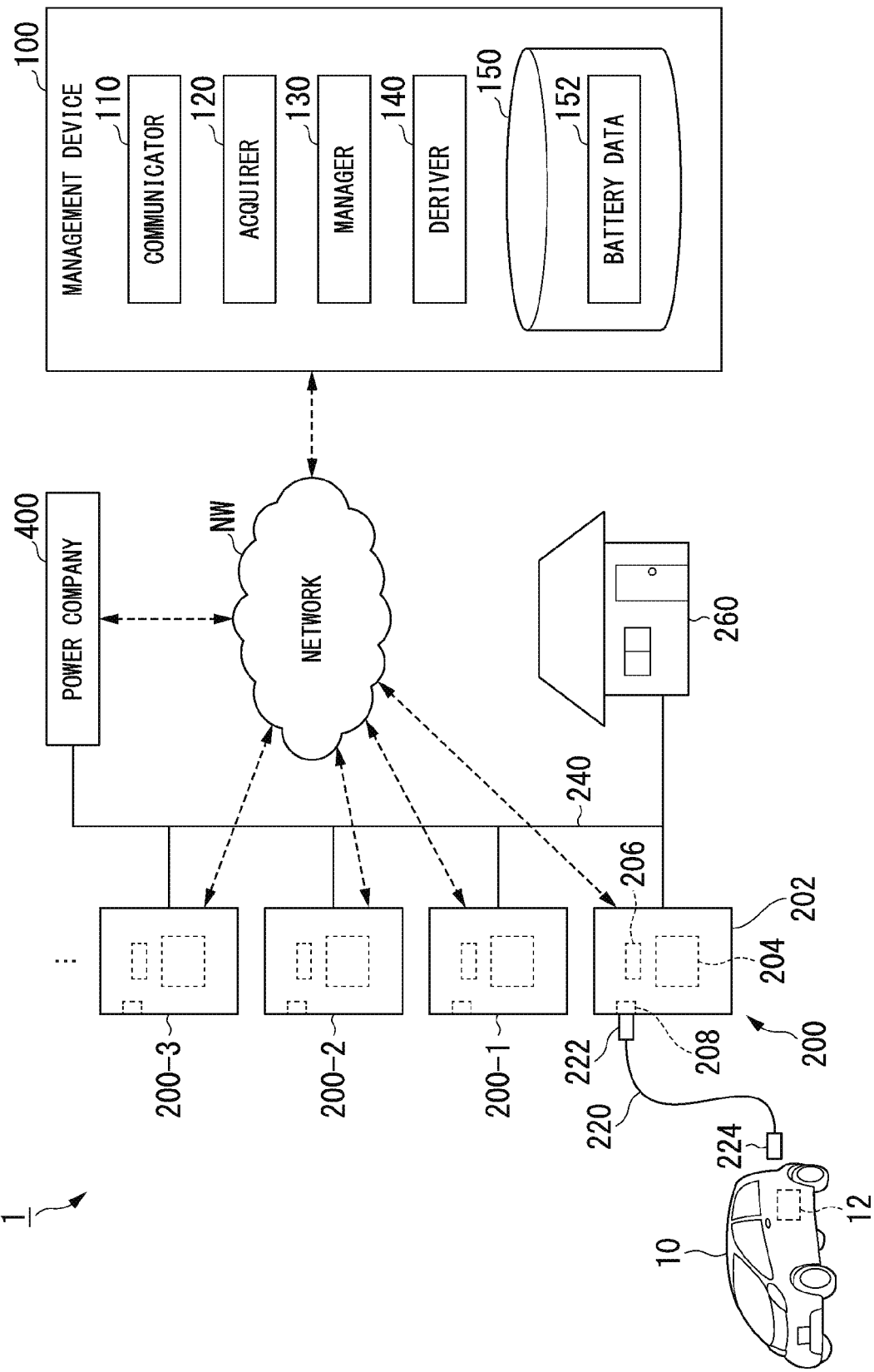
FIG. 1 is a diagram showing an example of a configuration and a usage environment of a management device according to a first embodiment.

FIG. 1 is a diagram showing an example of a configuration and a usage environment of a management device 100 according to a first embodiment. The management device 100 is a device for distributing profit that is obtained when power stored in a stationary battery (in the following description, the "battery" is synonymous with a "secondary battery") 204 possessed by a user is sold to a power company, and returning part of the profit to the user. An operator manages a plurality of stationary batteries 204 and returns part of the profit to each of a plurality of users. In the first embodiment, the operator evenly returns part of the profit to the plurality of users.

The operator performs, for example, sales of the electric vehicle and management of power using the management device 100. The vehicle 10 is a vehicle that is sold to a user by the operator, and includes an in-vehicle battery 12. The stationary battery 204 is a battery that is provided free of charge as a stationary one from the operator to the user when the operator has sold the vehicle 10 to the user. The stationary battery 204 is obtained by reusing an in-vehicle battery mounted in a vehicle in the past. The stationary battery 204 is, for example, a battery that is no longer suitable for in-vehicle use because the charging capacity no longer satisfies in-vehicle use. The vehicle in which the in-vehicle battery is mounted may be any vehicle. For example, the vehicle may be a vehicle that the user has traded with the operator, or may be another vehicle.

As shown in FIG. 1, the management device 100 communicates with a plurality of chargers 200 and a plurality of power companies 400 via a network NW. The network NW includes, for example, the Internet, a wide area network (WAN), a local area network (LAN), a provider device, or a wireless base station.

The management device 100 manages power on the basis of information transmitted by each of the plurality of chargers 200 (in FIG. 1, 200, 200-1, 200-2, 200-3, ..., referred to as a charger 200 when the plurality of chargers are not distinguished). The management device 100 communicates with the plurality of power companies 400 via the network NW. The plurality of chargers 200 all communicate with the plurality of power companies 400 via the network NW. In the following description, the charger 200 will first be described, and then, the management device 100 and the power company 400 will be described.

[Charger 200]

The charger 200 includes a housing 202, a stationary battery 204, a control device 206, and a cable connection port 208, as shown in FIG. 1. A power transmission line 240 is connected to the charger 200. The stationary battery 204 and the control device 206 are built in the housing 202. The stationary battery 204 is detachable from the housing 202. The stationary battery 204 can be replaced with another battery. The charger 200 is a stationary type. The charger 200, for example, is installed near a garage or the like of the user's home 260 of a user that possesses the vehicle 10. By the charger 200 being installed, it is possible to store and utilize midnight power, such that the user can charge the vehicle 10 with inexpensive electricity.

The stationary battery 204 is, for example, a secondary battery such as a lithium ion battery. The stationary battery 204 can store power. The stationary battery 204 can be charged with power and can discharge power. The power discharged from the stationary battery 204 is used, for example, for charging of the vehicle 10 possessed by the user and for use at the user's home 260 or is provided to the power company 400.

The control device 206 can communicate with the vehicle 10, the management device 100, and the power company 400. The control device 206 controls discharging and charging of the stationary battery 204 on the basis of input information from an input device (not shown) provided outside the housing 202, information provided by the vehicle 10, the management device 100, and the power company 400, or the like.

The cable connection port 208 is formed open at an outer surface of the housing 202. A charging cable 220 can be connected to the cable connection port 208. The charging cable 220 includes a first plug 222 and a second plug 224. The vehicle 10 is provided with a charging port (not shown). The first plug 222 is connected to the cable connection port 208 of the charger 200, and the second plug 224 is connected to the charging port of the vehicle 10.

The stationary battery 204 provided in the charger 200 and the in-vehicle battery 12 mounted in the vehicle 10 can be charged and discharged with each other. For example, the in-vehicle battery 12 is charged with the power discharged from the stationary battery 204 via the charging cable 220.

The stationary battery 204 is charged with the power discharged from the in-vehicle battery 12 via the charging cable 220.

The charging cable 220 includes a signal cable provided in the power cable. The signal cable mediates communication between the vehicle 10 and the charger 200. Therefore, each of the first plug 222 and the second plug 224 is provided with a power connector and a signal connector. The charger 200 may be connectable to the network NW.

The charger 200 is connected to the user's home 260 and the power company 400 via the power transmission line 240. The power discharged from the stationary battery 204 is supplied to the user's home 260 via the power transmission line 240. In the user's home 260, the provided power is used as home power. The power discharged from the stationary battery 204 is supplied to the power company 400 via the transmission line 240. The stationary battery 204 is charged with power provided by the power company 400.

[Management Device 100]

The management device 100 includes a communicator 110, an acquirer 120, a manager 130, a deriver 140, and a storage 150. The acquirer 120, the manager 130, and the deriver 140 are realized by a hardware processor such as a central processing unit (CPU) executing a program (software), for example. Some or all of these components may be realized by hardware (including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a non-transitory storage medium) such as a hard disk drive (HDD) or a flash memory in advance or may be stored in a detachable storage medium (a non-transitory storage medium) such as a DVD or a CD-ROM and installed by the storage medium being mounted in a drive device. The storage 150 is realized by the storage device described above.

The communicator 110 includes a communication interface such as an NIC. The communicator 110 performs transmission and reception of information between the plurality of chargers 200 and the power company 400 via the network NW. The communicator 110, for example, receives the charging information transmitted by each of the plurality of chargers 200. The communicator 110 receives power request information and charging completion information that are transmitted by the power company 400.

The power request information is information on the fact that the power company 400 requests power. The power request information includes, for example, information on an amount of power requested by the power company 400 (hereinafter referred to as "requested power"). The charging completion information is, for example, information on the fact that charging of power according to the power request information of the power company 400 has been completed. The charge completion information includes, for example, information for specifying the charger 200 that is a supply source of power received according to the power request information, and information on the amount of power received according to the power request information. The communicator 110 outputs various types of received information to the acquirer 120. The communicator 110 transmits supply availability information and supply unavailability information to the power company 400.

When it is assumed that a process of the management device 100 is performed, the plurality of chargers 200 each generate charging information including the voltage of the stationary battery 204, the SOC, and the like using the control device 206. The plurality of chargers 200 transmit the generated charging information to the management device 100. The charging information includes information on a discharge instruction subject when the stationary battery 204 has been discharged, in addition to information such as the voltage of the stationary battery 204. The discharge instruction subject is, for example, the user or the power company 400.

The charger 200 may transmit the charging information to the management device 100 at predetermined intervals, such as every day, may transmit the charging information to the management device 100 on the basis of a user instruction or may transmit the charging information to the management device 100 in response to a request from the management device 100. The charger 200 may transmit the charging information to the management device 100 when charging or discharging of the stationary battery 204 has started or ended. The charger 200 may transmit the charging information to the management device 100 at any of these timings.

The acquirer 120 acquires various types of information that are output by the communicator 110. The acquirer 120 outputs the various types of acquired information to the manager 130.

The manager 130 manages the power stored in the stationary battery 204. The manager 130 executes the power exchange business. The power exchange business is, for example, Vehicle to Grid (V2G) or Vehicle to Home (V2H). The power exchange business is performed by connecting the stationary battery 204 to the power company 400 included in the power network. When the manager 130 manages power of the stationary battery 204, the manager 130 manages the power stored in the stationary battery 204 as power that is preferentially used by the operator (hereinafter referred to as "operator-prioritized power") and power that is exclusively used by the user (hereinafter referred to as "user only power").

The manager 130 manages the power stored in the stationary battery 204 with a maximum allowable value of the user only power being constant. The manager 130 guarantees the maximum allowable value of the user only power in the power stored in the stationary battery 204 as power that can be used by the user. Therefore, it can be said that the user only power is user-guaranteed power. The manager 130 executes the power exchange business using an amount of power exceeding the user-guaranteed power in the power stored in the stationary battery 204 as the operator-prioritized power, to obtain a profit.

Figures 2, 3:
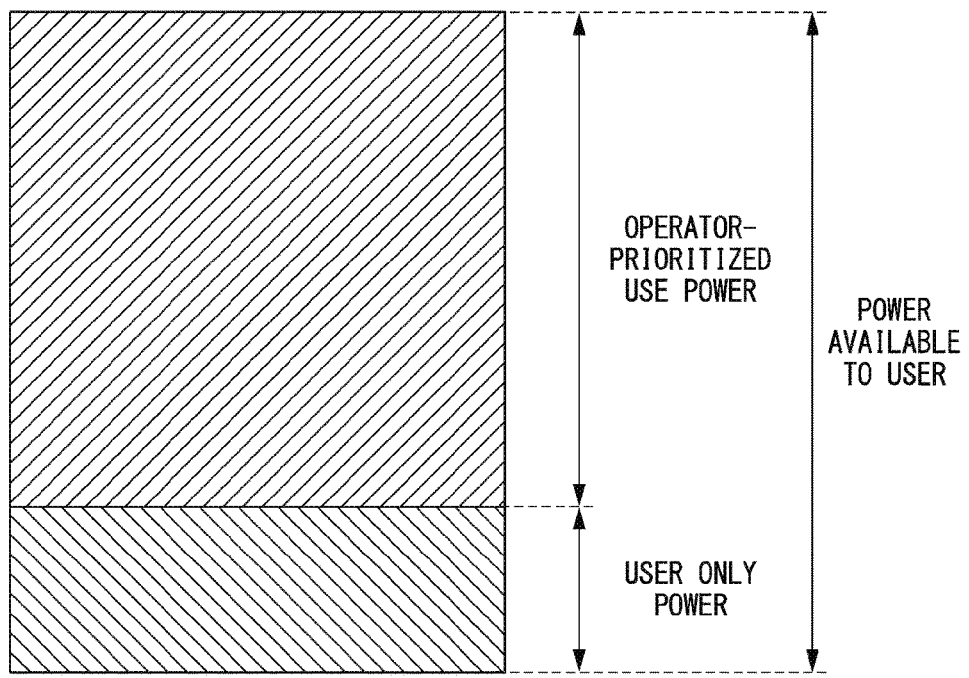
FIG. 2 is a diagram showing an example of battery data.
FIG. 3 is a diagram showing an example in which a fully charged state of a battery with a low deterioration state is visualized.

The manager 130 updates battery data 152 stored in the storage 150 on the basis of, for example, the charging information output by the acquirer 120 and stores the updated battery data 152 in the storage 150. FIG. 2 is a diagram showing an example of the battery data 152. Respective items of a battery ID, a level of deterioration at the time of provision, a date of provision, an estimated charging capacity, the user only power, the operator-prioritized power, sold power, and a user return ratio are included in the battery data 152.

The battery ID is a unique ID assigned to each of the chargers 200, 200-1, 200-2, 200-3, . . . shown in FIG. 1. The level of deterioration at the time of provision is a level of deterioration of the stationary battery 204 when the operator provides the stationary battery 204 to the user. The level of deterioration at the time of provision is denoted by LV1 to LV5, and the LV increases as deterioration becomes more severe. For example, a battery with the level of deterioration at the time of provision of LV2 more severely deteriorates than a battery with the level of deterioration at the time of provision of LV1, and a battery with the level of deterioration at the time of provision of LV3 more severely deteriorates than a battery with the level of deterioration at the time of provision of LV2. A battery with the level of deterioration at the time of provision of LV5 is a battery of which deterioration is most severe. A charging capacity of the stationary battery 204 is approximately proportional to a level of battery deterioration, and the charging capacity decreases when the level of battery deterioration increases.

A level of deterioration of the battery is calculated on the basis of, for example, a period in which the battery has been used, the number of times the battery is discharged and charged, or a total amount of power by or with which the battery is discharged or charged. For example, a level of deterioration of a battery with a longer use period is higher than that of a battery with a shorter use period. A level of deterioration of a battery with a large number of times the battery is discharged and charged is higher than that of a battery with a small number of times the battery is discharged and charged.

Figure 4:
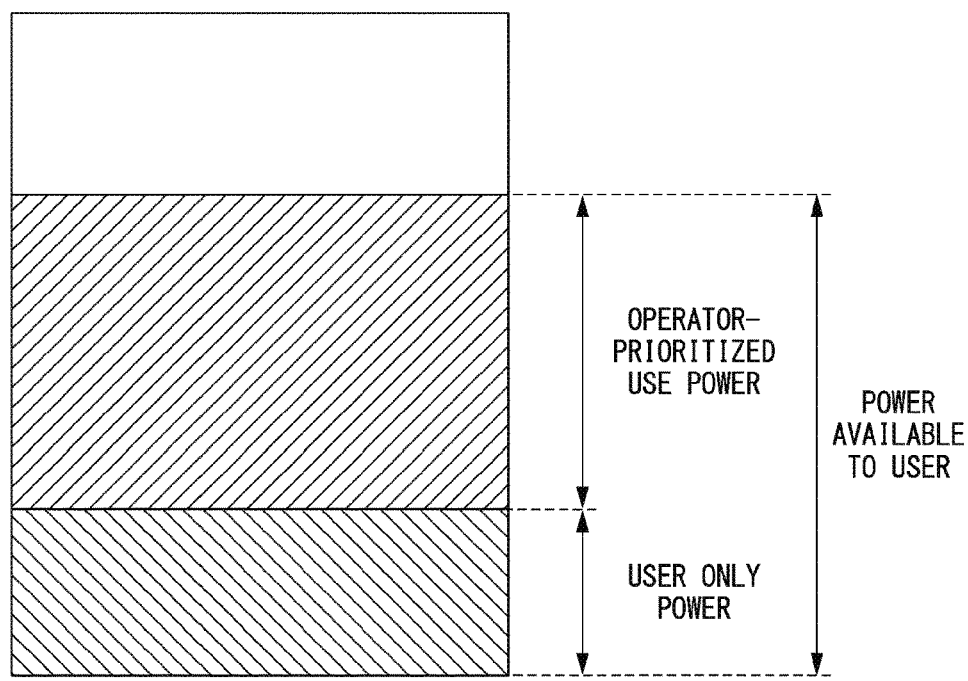
FIG. 4 is a diagram showing an example in which a fully charged state of a battery in a moderate deterioration state is visualized.
Figure 5:
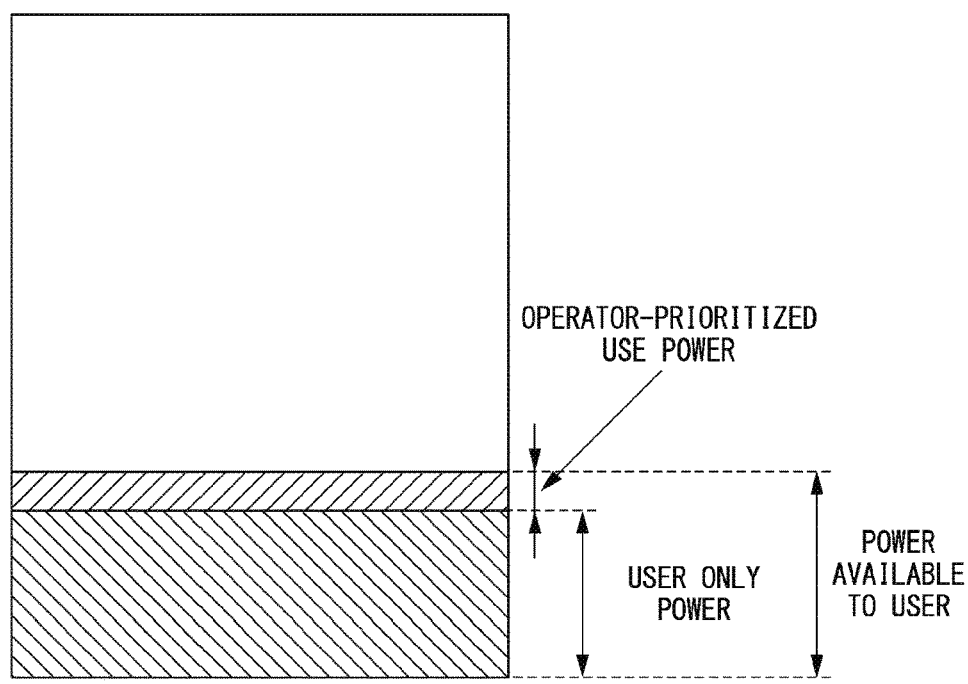
FIG. 5 is a diagram showing an example in which a fully charged state of a battery in a high deterioration state is visualized.

FIGS. 3 to 5 are diagrams in which a ratio between the user only power and the operator-prioritized power in the power stored in the stationary battery 204 is visualized. FIG. 3 shows the ratio between the user only power and the operator-prioritized power in a stationary battery with a low level of deterioration. FIG. 4 shows the ratio between the user only power and the operator-prioritized power in a stationary battery with a moderate level of deterioration. FIG. 5 shows the ratio between the user only power and the operator-prioritized power in the stationary battery with a high level of deterioration.

As shown in FIGS. 3 to 5, the user only power in the power stored in the stationary battery 204 is constant, and an amount of the operator-prioritized power varies according to the level of deterioration. As shown in FIG. 3, in the case of the stationary battery 204 with a low level of deterioration, the operator-prioritized power increases. As shown in FIG. 4, in the case of the stationary battery 204 having a moderate level of deterioration, the operator-prioritized power is moderate. As shown in FIG. 5, in the case of the stationary battery 204 with a high level of deterioration, the operator-prioritized power decreases.

The operator-prioritized power is power that can be preferentially used by the operator, but the operator-prioritized power can also be used by the user when the operator-prioritized power is not being used by the operator. Therefore, all the power stored in the stationary battery 204 is power that can be used by the user when the power is not being used by the operator. When the user uses the user only power, the operator does not charge the user. However, when the user uses the operator-prioritized power, the operator charges the user. When the user uses the power stored in the stationary battery 204, the user only power is preferentially used, and when power cannot be supplied by the user only power, the operator-prioritized power is used.

The date of provision is a date when the operator has provided the stationary battery 204 to the user. For example, the stationary battery 204 of which the battery ID is 0001 is a battery that the operator has provided to the user in February, 2017. The estimated charging capacity is a charging capacity that is calculated and estimated on the basis of a discharging and charging state of the battery, or years of use, and is substantially the same amount as the power stored in the stationary battery 204 that is in a fully charged state.

Part of a total amount of power stored in the stationary battery 204 is the user only power, and the other part of the total amount of power stored in the stationary battery 204 is the operator-prioritized power. The user only power and the operator-prioritized power, for example, are calculated and updated on the basis of the charging information that is transmitted by the charger 200.

The sold power is power that has been sold by the power discharged from the stationary battery 204 being provided to the power company 400 through the power exchange business. The user return ratio indicates a ratio of a profit returned to the user to a profit obtained by selling power. In the first embodiment, the user return ratio is uniformly 20%.

When the operator has newly provided the stationary battery 204 to the user, the manager 130 assigns a new battery ID to the battery. The manager 130 adds the battery ID, the level of deterioration at the time of provision, the date of provision, and the estimated charging capacity (an initial value) for the battery to the battery data 152. Thus, the manager 130 performs management of the plurality of stationary batteries 204 and adds data of the battery data 152 when the stationary battery 204 has newly been provided to the user.

The manager 130 calculates the number of times of discharging and charging or a total amount of discharging and charging of the stationary battery 204 on the basis of the charging information transmitted by the stationary battery 204. The manager 130 calculates the estimated charging capacity of the stationary battery 204 on the basis of a time elapsed since the stationary battery 204 is provided, the number of times of discharging and charging or the total amount of discharging and charging of the stationary battery 204 calculated on the basis of the charging information, or the like. The manager 130 updates the estimated charging capacity in the battery data 152 on the basis of a calculation result of the estimated charging capacity, and stores the updated estimated charging capacity in the storage 150.

The manager 130 updates the user only power and the operator-prioritized power on the basis of the charging information transmitted by the charger 200. For example, the manager 130 calculates the power stored in the stationary battery 204 on the basis of the estimated charging capacity stored as the battery data 152 and the charging information transmitted by the charger 200.

For example, when power calculated on the basis of the charging information transmitted at a current time is lower than power calculated on the basis of the charging information transmitted at a previous time, a sum of the user only power and the operator-prioritized power stored as the battery data 152 is reduced. In this case, the manager 130 confirms the discharge instruction subject included in the charging information.

When the discharge instruction subject included in the charging information is the user, the manager 130 subtracts an amount of decrease in power from the user only power. When the discharge instruction subject is the power company 400, the manager 130 subtracts the amount of decrease in power from the operator-prioritized power. When the user only power or the operator-prioritized power has decreased, the manager 130 updates the decreased user only power or operator-prioritized power in the battery data 152, and stores the updated user only power or operator-prioritized power in the storage 150.

Figure 6:
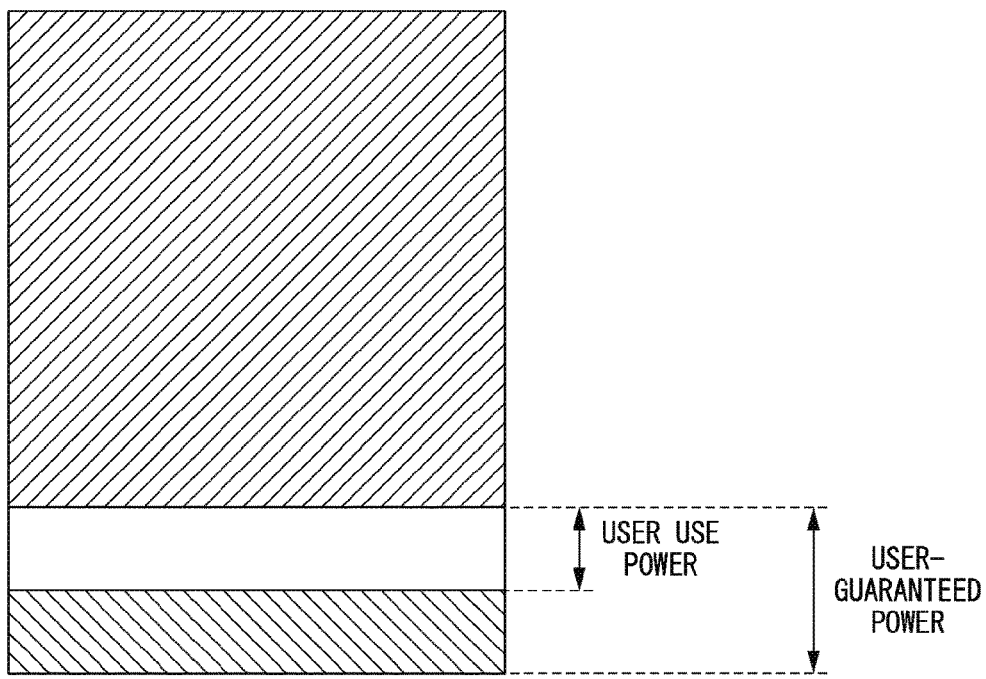
FIG. 6 is a diagram showing an example in which a state in which user only power has been discharged from a battery in a fully charged state is visualized.
Figure 7:
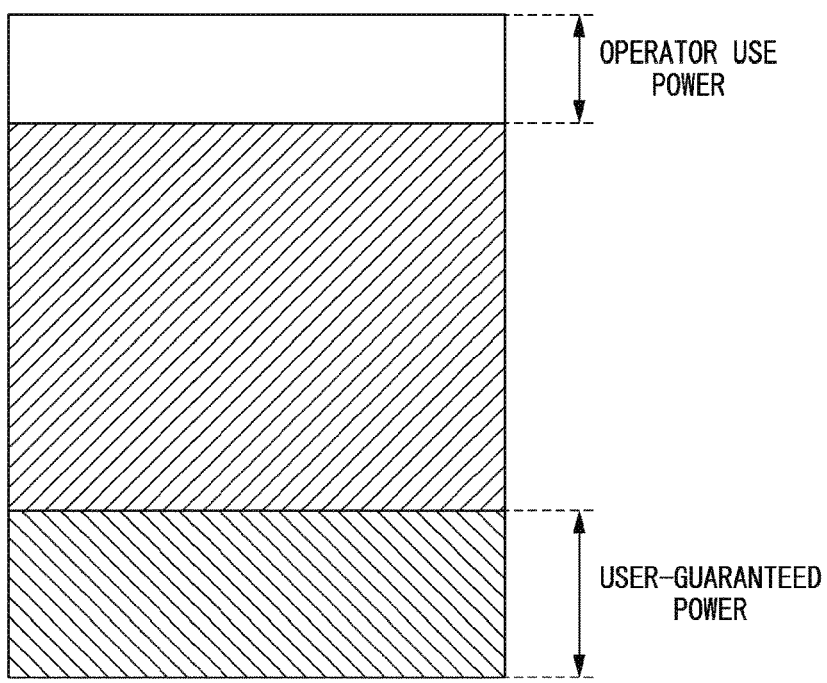
FIG. 7 is a diagram showing an example in which a state in which operator-prioritized power has been discharged from a battery in a fully charged state is visualized.

FIG. 6 is a diagram in which a state in which the user only power has been used from the power stored in the stationary battery 204 is visualized. FIG. 7 is a diagram in which a state in which the operator-prioritized power has been used from the power stored in the stationary battery 204 is visualized. As shown in FIG. 6, when the user only power has been used from the power stored in the stationary battery 204, the user only power decreases and the operator-prioritized power does not decrease. On the other hand, as shown in FIG. 7, when the operator-prioritized power has been used from the power stored in the stationary battery 204, the operator-prioritized power decreases and the user only power does not decrease.

When the power request information has been transmitted by the power company 400, the manager 130 compares the requested power based on the power request information with a total amount of operator-prioritized power stored in the stationary batteries 204 in the plurality of chargers 200, 200-1, 200-2, 200-3, . . . . When the total amount of operator-prioritized power is larger than the requested power based on the power request information, the manager 130 outputs the supply availability information to the communicator 110. The supply availability information includes information on the charger 200 that can supply power, and an amount of power that can be supplied by each charger 200. When the total amount of operator-prioritized power is smaller than the requested power based on the power request information, the manager 130 outputs the supply unavailability information to the communicator 110.

The manager 130 obtains the sold power on the basis of the charging completion information transmitted by the power company 400. The manager 130 updates the sold power in the battery data 152. The manager 130 outputs the sold power and the user return ratio in the battery data 152 to the deriver 140.

The deriver 140 derives the return information on the basis of the sold power and the user return ratio output by the manager 130. The return information is information indicating part of the profit when part of the profit obtained through the power exchange business is returned to the user. The deriver 140 multiplies the sold power output by the manager 130 by a unit price of the power to calculate the profit obtained through the power exchange business. The unit price of the power may be stored in the storage 150 in advance or may be provided by the power company 400 or the like.

The deriver 140 multiplies the calculated profit by the user return ratio to generate the return information. The deriver 140 stores, for example, the derived return information in the storage 150. Alternatively, the deriver 140 outputs the derived return information to a display device, a printing device, or the like (not shown) so that the return information is displayed on the display device or printed by the printing device. The deriver 140 may provide the return information to the user, the power company 400, or a third party, or may be used as data for payment to the user via a financial institution.

[Power Company 400]

The power company 400 provides a service for supplying power to consumers. The power company 400, for example, supplies electricity to the charger 200 or receives supply of electricity from the charger 200 via the power transmission line 240. The power company 400 transmits the power request information to the management device 100 when the power company 400 desires to receive the supply of the power. The power company 400 receives the supply of the power from the charger 200 on the basis of the supply availability information transmitted by the management device 100 that has received the power request information.

Figure 8:
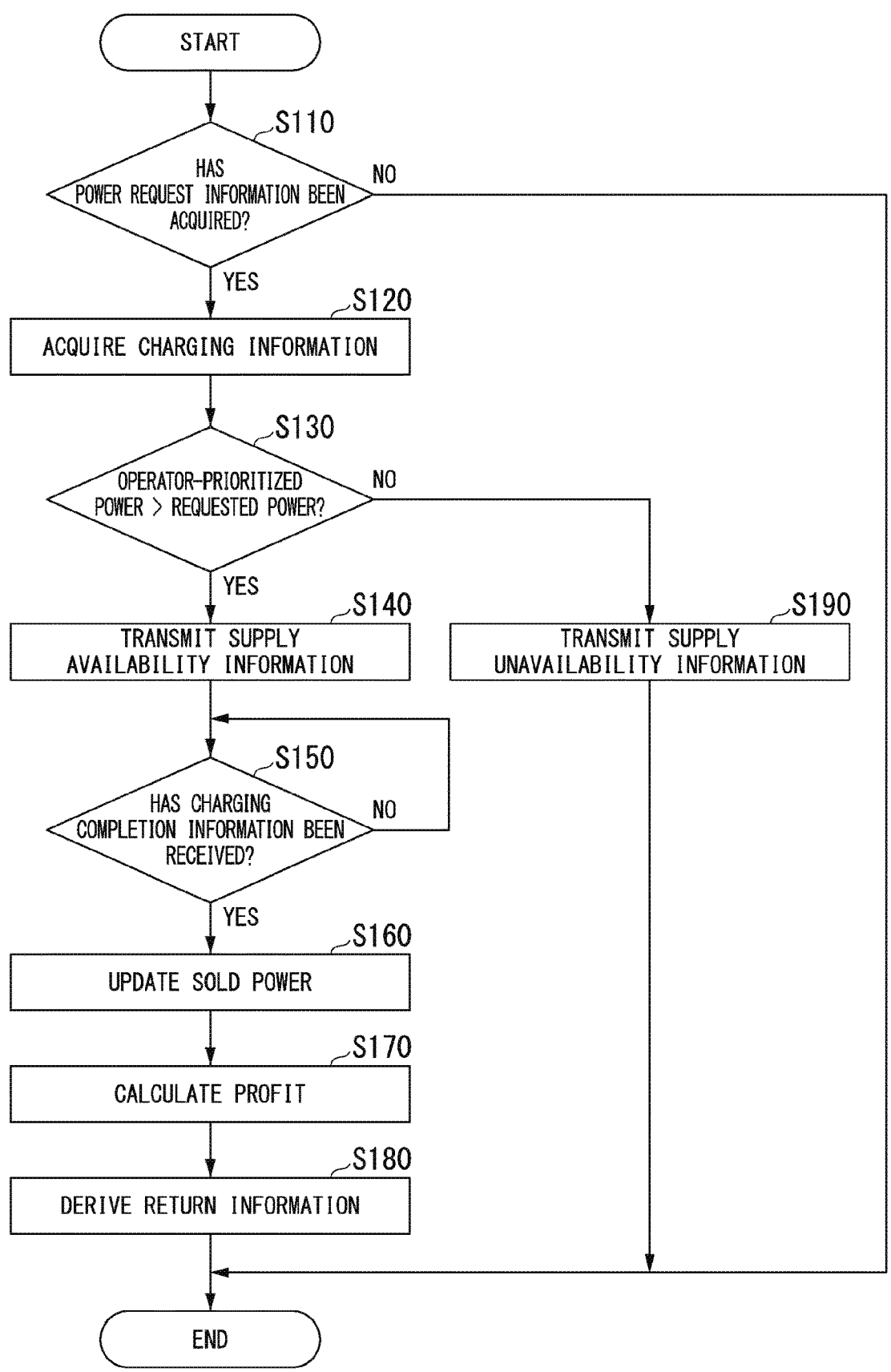
FIG. 8 is a flowchart showing an example of a flow of a process that is executed by each unit of the management device.

Next, a process in the management device 100 will be described. FIG. 8 is a flowchart showing an example of a flow of a process that is executed in the management device 100. The acquirer 120 determines whether or not the power request information transmitted by the power company 400 has been acquired (step S110). When the acquirer 120 has determined that the power information has not been acquired, the management device 100 ends the process shown in FIG. 8.

When it is determined that the power request information has been acquired, the management device 100 requests the plurality of chargers 200 to transmit the charging information. The acquirer 120 acquires the charging information that has been transmitted by the plurality of chargers 200 in response to the request from the management device 100 (step S120). Subsequently, the manager 130 calculates the total amount of operator-prioritized power on the basis of the charging information transmitted by the plurality of chargers 200.

Subsequently, the manager 130 determines whether or not the total amount of operator-prioritized power exceeds the requested power (step S130). When the manager 130 has determined that the total amount of operator-prioritized power exceeds the requested power, the manager 130 generates the supply availability information, and the management device 100 transmits the supply availability information from the communicator 110 to the power company 400 (step S140). The power company 400 receives the supply of the power from the plurality of chargers 200 on the basis of the supply availability information transmitted by the management device 100. The power company 400 that has received supply of power transmits the charging completion information to the management device 100.

After the management device 100 has transmitted the supply availability information, the manager 130 determines whether or not the charging completion information transmitted by the power company 400 has been received (step S150). When the manager 130 has determined that the charge completion information has not been received, the manager 130 repeats the process of step S150.

When the manager 130 has determined that the charging completion information has been received, the manager 130 obtains and updates the sold power on the basis of the charging completion information received by the communicator 110 (step S160). Subsequently, the deriver 140 calculates the profit obtained through the power exchange business on the basis of the sold power updated by the manager 130 (step S170). Subsequently, the deriver 140 multiplies the calculated profit by the user return ratio output by the manager 130 to derive the return information for returning part of the profit obtained through the power exchange business to the user (step S180). Thus, the management device 100 ends the process shown in FIG. 8.

When the manager 130 has determined in step S130 that the total amount of operator-prioritized power does not exceed the requested power, the manager 130 generates the supply unavailability information, and the management device 100 transmits the supply unavailability information generated by the manager 130 to the power company 400 (step S190). Thus, the management device 100 ends the process shown in FIG. 8.

According to the embodiment described above, the management device 100 executes the power exchange business that is performed by connecting the charger 200 to the power company 400 to derive the return information for returning part of the profit obtained through the power exchange business to the user. Therefore, since an amount to be returned to the user in the profit obtained through the power exchange business can be easily derived, a profit between the operator executing the power exchange business and the user can be easily adjusted.

The stationary battery 204 is an in-vehicle battery that is used as the stationary battery 204 as is. Therefore, it is possible to reuse, for stationary use, an in-vehicle battery no longer suitable for use in an electric vehicle, such as not satisfying a charging capacity required for the in-vehicle battery. Therefore, it is possible to easily reuse the in-vehicle battery that has deteriorated.

The stationary battery 204 is provided free of charge to the vehicle 10 that the operator has sold to the user. For example, the in-vehicle battery that has deteriorated can be used for other uses, for example, as a stationary battery in the charger 200, although the in-vehicle battery that has deteriorated is difficult for in-vehicle use. Therefore, it is conceivable that the operator sells the in-vehicle battery that has deteriorated for stationary use to the user. However, it is conceivable that, since it is difficult for the user to find a value of the in-vehicle battery that has deteriorated, the user hesitates to purchase the in-vehicle battery.

Therefore, it is conceivable that, for example, the operator provides an in-vehicle battery that has deteriorated free of charge to a user who has purchased the vehicle. Even when the in-vehicle battery is an in-vehicle battery that has deteriorated and of which value is difficult to find for purchase, the user is more likely to accept the in-vehicle battery for stationary use when the in-vehicle battery is free of charge. However, when the in-vehicle battery is merely provided free of charge, a profit of the operator decreases.

In this respect, since the management device 100 of the first embodiment executes the power exchange business using the in-vehicle battery provided free of charge, the management device 100 can bring benefits to the operator. Further, since the management device 100 returns part of the profit of the operator to the user, the profit between the operator and the user can be easily adjusted.

Second Embodiment

Hereinafter, a second embodiment of the present invention will be described.

A management device 100 according to the second embodiment has the same configuration as the management device 100 according to the first embodiment. In the management device 100 of the second embodiment, a user return ratio in the battery data 152 stored in the storage 150 is different. Hereinafter, the second embodiment will be described focusing on differences from the first embodiment. In the first embodiment, in each of the plurality of chargers 200, the user return ratio is uniformly 20%, and the operator returns part of the profit evenly to the plurality of users. On the other hand, in the second embodiment, the user return ratio is different among the plurality of chargers 200, and proportions of return of part of the profit are different among users.

FIG. 9 is a diagram showing an example of battery data according to the second embodiment. The manager 130 updates the user return ratio for each stationary battery 204 when updating the battery data 152 stored in the storage 150. Therefore, in the battery data 152 shown in FIG. 9, different user return ratios are set for the stationary batteries 204 having different battery IDs.

The manager 130 updates the user return ratio on the basis of the level of deterioration at the time of provision and the installation period of the stationary battery 204. As shown in FIG. 10, the manager 130 decreases the user return ratio when the level of deterioration at the time of provision of the stationary battery 204 is low. When the level of deterioration at the time of provision of the stationary battery 204 is moderate, the manager 130 sets the user return ratio to medium. When the level of deterioration at the time of provision of the stationary battery 204 is high, the manager 130 increases the user return ratio.

The manager 130, for example, sets the user return ratio of 19.0% for the stationary battery 204 with the level of deterioration at the time of provision of LV1 and the user return ratio of 19.5% for the stationary battery 204 with the level of deterioration at the time of provision LV2. The manager 130 sets the user return ratio of 20.0% for the stationary battery 204 with the level of deterioration at the time of provision of LV3, the user return ratio of 20.5% for the stationary battery 204 with the level of deterioration at the time of provision of LV4, and the user return ratio of 21.0% for the stationary battery 204 with the level of deterioration at the time of provision of LV5.

The manager 130 sets the user return ratio to be low when an installation period of the stationary battery 204 is short as shown in FIG. 11. The manager 130 sets the user return ratio to be moderate when the installation period of the stationary battery 204 is moderate. The manager 130 sets the user return ratio to be high when the installation period of the stationary battery 204 is long.

The manager 130 sets the user return ratio higher as the installation period of the stationary battery 204 becomes longer, for example, by increasing the user return ratio by 0.5% each time five years have elapsed. The manager 130 sets a lower limit value of the user return ratio to 18.0% and an upper limit value to 22.0%. When the user return ratio exceeds 22.0% in calculation, the manager 130 sets the user return ratio to 22.0%. When the user return ratio falls below 18.0%, the manager 130 sets the user return ratio to 18.0%.

Figure 12:
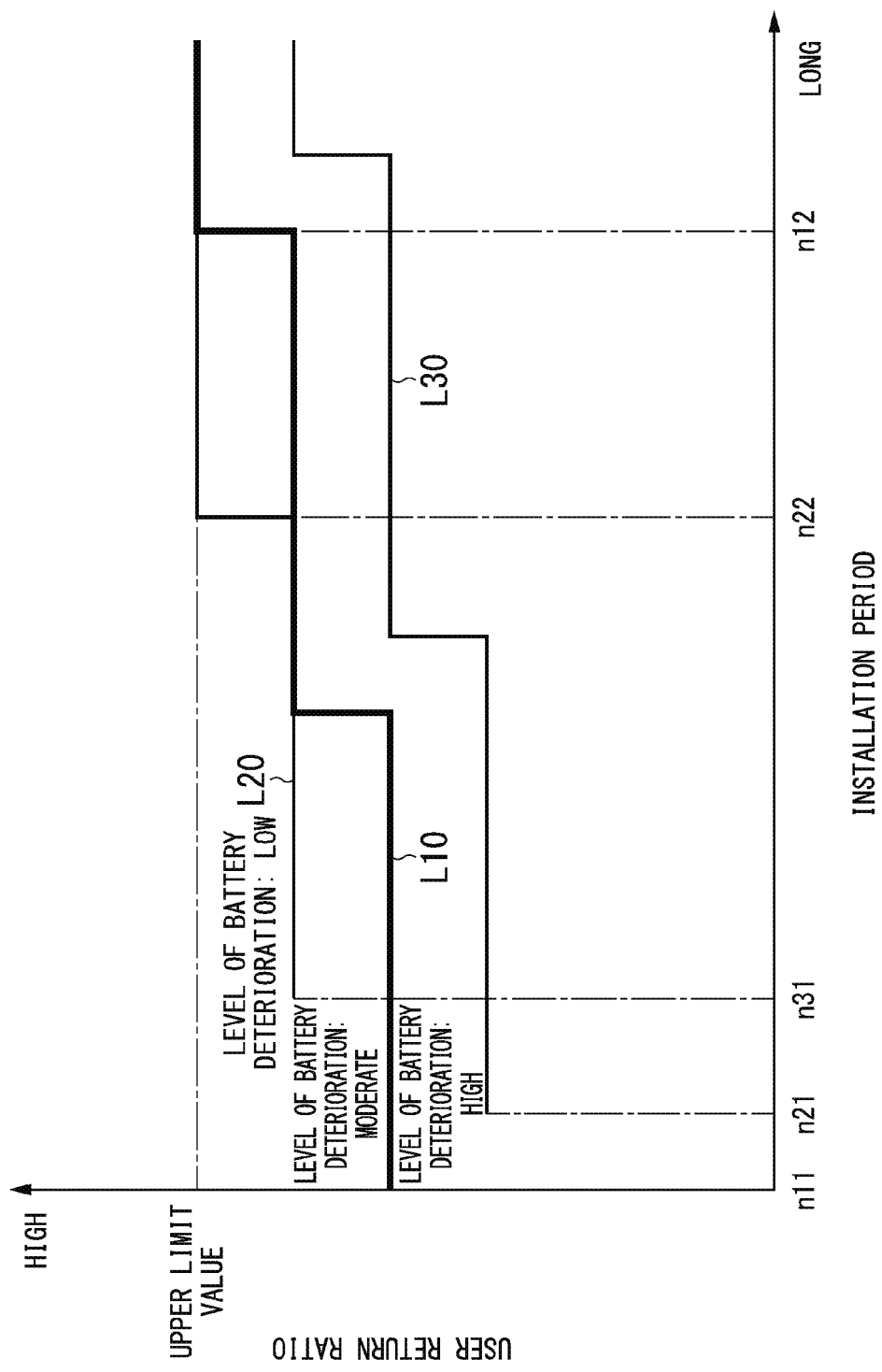
FIG. 12 is a graph showing an example of a transition of the user return ratio.

FIG. 12 is a diagram showing an example of a change in the user return ratio according to the installation period of the stationary battery 204. For example, it is assumed that a stationary battery 204 with a moderate level of deterioration at the time of provision is provided at time n11, a stationary battery 204 with a high level of deterioration at the time of provision is provided at time n21, and a stationary battery 204 having a low level of deterioration at the time of provision is provided at time n31. Hereinafter, in a description of FIG. 12, the stationary battery 204 provided at time n11 is referred to as a first battery, the stationary battery 204 provided at time n21 is referred to as a second battery, and the stationary battery 204 provided at time n31 is referred to as a third battery. Graphs L10, L20, and L30 show changes in the user return ratio according to installation periods of the first battery, the second battery, and the third battery, respectively.

As shown in the graph L10, a user return ratio of the first battery with the moderate level of deterioration at the time of provision increases as the installation period becomes longer, and reaches an upper limit value of the user return ratio at time n12. The user return ratio of the first battery becomes constant after the user return ratio has reached the upper limit value.

As shown in the graph L20, the user return ratio at the time of providing the second battery with the high level of deterioration at the time of provision is higher than the user return ratio at the time of providing the first battery. The user return ratio of the second battery increases as the installation period becomes longer, and reaches an upper limit value of the user return ratio at time n22. A time when the user return ratio of the second battery reaches the upper limit is earlier than the time when the user return ratio of the first battery reaches the upper limit.

As shown in the graph L30, the user return ratio at the time of providing the third battery with the low level of deterioration at the time of provision is lower than the user return ratio at the time of providing the second battery. The user return ratio of the third battery increases as the installation period becomes longer. In FIG. 12, the user return ratio of the third battery does not reach an upper limit value, but when the installation period becomes longer, the user return ratio of the third battery reaches the upper limit value.

In the management device 100 of the second embodiment, the user return ratio in the stationary battery 204 is different for each stationary battery 204. Therefore, part of the profit can be provided to the user at a return ratio according to individual performance of the stationary battery 204. For example, since the stationary battery 204 also deteriorates due to use and the charging capacity decreases similarly to the in-vehicle battery 12, an available period is limited.

In the management device 100 of the second embodiment, the user return ratio decreases as the level of deterioration at the time of provision decreases. Therefore, since the profit is returned to the user at a low proportion with respect to the stationary battery 204 that can supply power for a long time, the profit obtained in the power exchange business can be appropriately returned to the user. In the management device 100 of the second embodiment, the user return ratio is set to be higher as the installation period of the stationary battery 204 becomes longer. Therefore, since the profit can be returned to the user at a high proportion with respect to the stationary battery 204 that has supplied power for a long period, the profit obtained in the power exchange business can be appropriately returned to the user.

In each of the above embodiments, the operator performs, for example, sales of electric vehicles and management of power using the management device 100, and the operator provides the battery to the user. However, the operator may not be a person that perform sales of electric vehicles. The operator and the battery provider may be different.

Although the power stored in the stationary battery 204 is divided into the operator-prioritized power and the user only power in each of the embodiments described above, the user only power may not be provided and only the operator-prioritized power may be provided. When the user only power is set, a battery that is provided to the user may be limited to a battery of which a charging capacity at the time of provision is equal to or larger than the user only power.

Although the operator-prioritized power can be used by the user in each of the above embodiments, the operator-prioritized power may not be used by the user. Although the user only power is used when the user uses the power stored in the stationary battery 204 in each of the above embodiments, the user may be able to select and instruct use of any one of the user only power and the operator-prioritized power.

A transition from the operator-prioritized power to the user only power may be able to made on the basis of a user instruction or the like. When the user uses the operator-prioritized power or the transition to the user only power is made, for example, the operator may charge the user. In this case, when the user uses the operator-prioritized power, a price may be adjusted appropriately, for example, to a lower price than when the power is supplied to another power company or the like.

Although the operator provides the stationary battery 204 free of charge to the user in each of the above embodiments, the operator may provide the stationary battery 204 to the user at a cost. Instead of providing the stationary battery 204 to the user, the operator may lend (so-called lease) the stationary battery 204.

Although the manager 130 sets a rate of increase in the user return ratio to be constant regardless of the installation period of the stationary battery 204 in the second embodiment, the manager 130 may change the rate of increase in the user return ratio according to the installation period of the stationary battery 204. For example, the manager 130 may set the rate of increase in the user return ratio to be lower as the installation period becomes longer. The manager 130 may set the user return ratio to be low. For example, when the installation period of the stationary battery 204 is long, the manager 130 may set the user return ratio to be low.

Although conditions for providing the stationary battery to the user are not particularly defined in each of the above embodiments, predetermined conditions may be defined. For example, a battery provider may provide a stationary battery only to a user who has replaced his or her vehicle with a vehicle sold by the provider. The provider may provide batteries with different levels of deterioration to the user according to a price of the vehicle purchased by the user. For example, the provider may provide a battery with a lower level of deterioration as a stationary battery to the user as the price of the vehicle purchased by the user is higher.

Although the form for implementing the present invention has been described using the embodiments, the present invention is not limited to such embodiments at all, and various modifications and substitutions can be made without departing from the gist of the present invention.

What is claimed is:

1. A management device comprising:
    a manager configured to manage power stored in a secondary battery provided to a user for stationary use and execute a power exchange business, the power exchange business being performed by connecting the secondary battery to a power network; and
    a deriver configured to derive return information for returning part of a profit obtained through the power exchange business to the user,
    wherein the deriver is configured to adjust the return information on the basis of a level of deterioration of the secondary battery.

2. The management device according to claim 1, wherein the deriver is configured to derive the return information on the basis of an amount of power of the secondary battery used by an operator of the power exchange business.

3. The management device according to claim 1, wherein the manager is configured to manage the power stored in the secondary battery as power used by an operator of the power exchange business and power used exclusively by the user.

4. The management device according to claim 3, wherein the manager is configured to manage the power stored in the secondary battery with a maximum allowable value of power used exclusively by the user being constant.

5. The management device according to claim 1, wherein the deriver is configured to set a ratio of return to the user to be lower as a level of deterioration of the secondary battery at the time of provision decreases.

6. The management device according to claim 1, wherein the deriver is configured to set a ratio of return to the user to be higher as an installation period of the secondary battery becomes longer.

7. The management device according to claim 1, wherein the secondary battery has been used for in-vehicle use.

8. A management method using a computer, comprising:
managing power stored in a secondary battery provided to a user for stationary use and executing a power exchange business, the power exchange business being performed by connecting the secondary battery to a power network; and
deriving return information for returning part of a profit obtained through the power exchange business to the user,
wherein the deriving of the return information comprises adjusting the return information on the basis of a level of deterioration of the secondary battery.

9. A computer-readable non-transitory storage medium storing a program, the program causing a computer to:
manage power stored in a secondary battery provided to a user for stationary use and execute a power exchange business, the power exchange business being performed by connecting the secondary battery to a power network; and
derive return information for returning part of a profit obtained through the power exchange business to the user,
wherein the deriving of the return information comprises adjusting the return information on the basis of a level of deterioration of the secondary battery.

* * * * *